United States Patent [19]

Bailey et al.

[11] Patent Number: 5,527,161

[45] Date of Patent: Jun. 18, 1996

[54] FILTERING AND DISPENSING SYSTEM

[75] Inventors: David C. Bailey, San Jose; Ian R. Raphael, Campbell, both of Calif.

[73] Assignee: Cybor Corporation, San Jose, Calif.

[21] Appl. No.: 285,662

[22] Filed: Aug. 3, 1994

Related U.S. Application Data

[63] Continuation of Ser. No. 835,632, Feb. 13, 1992, abandoned.

[51] Int. Cl.$^6$ ............................................. F04B 39/10
[52] U.S. Cl. ............................................. 417/53; 417/302
[58] Field of Search ....................................... 417/53, 302

[56] References Cited

U.S. PATENT DOCUMENTS

| | | |
|---|---|---|
| 2,215,505 | 9/1940 | Hollander . |
| 2,674,188 | 4/1954 | Young . |
| 3,169,647 | 2/1965 | Hummel . |
| 3,169,674 | 2/1965 | Lund et al. . |
| 3,276,673 | 10/1966 | Jones et al. . |
| 3,402,667 | 9/1968 | Bower, Jr. . |
| 3,428,042 | 2/1969 | Chestnut . |
| 3,507,583 | 4/1970 | James . |
| 3,601,509 | 8/1971 | Kreitchman . |
| 3,637,329 | 1/1972 | Kurokawa et al. . |
| 3,777,888 | 12/1973 | Zellbeck et al. . |
| 3,810,480 | 5/1974 | Smith et al. . |
| 3,847,111 | 11/1974 | Kreutzer . |
| 3,910,462 | 10/1975 | Abeles et al. . |
| 3,963,380 | 6/1976 | Thomas, Jr. et al. . |
| 4,083,186 | 4/1978 | Jackson, Sr. . |
| 4,119,228 | 10/1978 | Holmes . |
| 4,127,360 | 11/1978 | Carpenter . |
| 4,139,333 | 2/1979 | Sipos . |
| 4,146,485 | 3/1979 | Broad . |
| 4,160,727 | 7/1979 | Harris, Jr. . |
| 4,187,173 | 2/1980 | Keefer . |
| 4,195,480 | 4/1980 | Shelby et al. . |
| 4,195,628 | 4/1980 | Lubitzsch et al. . |
| 4,225,290 | 9/1980 | Allington . |
| 4,227,546 | 10/1980 | Bergeson . |
| 4,321,014 | 3/1982 | Eburn, Jr. et al. . |
| 4,321,137 | 3/1982 | Kohler . |
| 4,344,768 | 8/1982 | Parker et al. . |
| 4,345,483 | 8/1982 | Paletta et al. . |
| 4,347,131 | 8/1982 | Brownlee . |

(List continued on next page.)

FOREIGN PATENT DOCUMENTS

| | | |
|---|---|---|
| 077908 | 11/1982 | European Pat. Off. . |
| 1402976 | of 1965 | France . |
| 3308891A1 | 9/1984 | Germany . |
| 660559 | 5/1987 | Switzerland . |
| 277609 | 5/1928 | United Kingdom . |
| 2150981 | 7/1985 | United Kingdom . |
| 2156445 | 10/1985 | United Kingdom . |

OTHER PUBLICATIONS

*Instrument Engineers' Handbook*, c. 1969/1985, p. 521 and 528.

*Primary Examiner*—Richard A. Bertsch
*Assistant Examiner*—Xuan M. Thai
*Attorney, Agent, or Firm*—Baker & McKenzie

[57] ABSTRACT

A liquid pumping and filtering system for use in dispensing materials such as photoresist used to make semiconductors. A positive displacement diaphragm pump is used to draw source liquid from a source bottle. A pump valve is activated to direct fluid from the pump to a main dispensing line which includes a filter. A suckback line bridges the dispense line. The suckback line and the dispense line are each connected to a final dispense line, and the flow of liquid is controlled by a filter valve, which alternative causes fluid to flow through the suckback line or the dispense line, depending upon the mode of operation of the system. The use of an independent suckback line allows the quick withdrawal of fluid away from the dispense nozzle in the final dispense line. As a result, liquid in the dispensing line on opposite sides of the filter is generally maintained at constant pressure. Air bubbles trapped in the filter, which are generally unavoidable because of the construction thereof, are not allowed to expand and therefore do not distort measurements of liquid being dispensed.

9 Claims, 1 Drawing Sheet

U.S. PATENT DOCUMENTS

| | | |
|---|---|---|
| 4,376,449 | 3/1983 | Nelson et al. . |
| 4,389,163 | 6/1983 | Magnussen, Jr. et al. . |
| 4,428,228 | 1/1984 | Banzhaf et al. . |
| 4,448,692 | 5/1984 | Nakamoto et al. . |
| 4,475,666 | 10/1984 | Bilbrey et al. . |
| 4,483,665 | 11/1984 | Hauser ................................... 417/401 |
| 4,493,614 | 1/1985 | Chu et al. . |
| 4,496,287 | 1/1985 | Nelson et al. . |
| 4,527,479 | 7/1985 | Dahlgren et al. . |
| 4,551,105 | 11/1985 | Hall . |
| 4,553,697 | 11/1985 | Nothen et al. . |
| 4,566,868 | 1/1986 | Menzies . |
| 4,582,598 | 4/1986 | Bilstad et al. . |
| 4,592,786 | 6/1986 | Williams et al. . |
| 4,597,717 | 7/1986 | Mohr . |
| 4,601,409 | 7/1986 | DiRegolo . |
| 4,609,330 | 9/1986 | Fahey et al. . |
| 4,618,425 | 10/1986 | Yates . |
| 4,624,625 | 11/1986 | Schrenker . |
| 4,627,235 | 12/1986 | Kindermann et al. . |
| 4,636,238 | 1/1987 | Sidler . |
| 4,642,098 | 2/1987 | Lundquist . |
| 4,660,741 | 4/1987 | Kirschner et al. . |
| 4,676,905 | 6/1987 | Nagao et al. . |
| 4,681,513 | 7/1987 | Saito et al. . |
| 4,683,212 | 7/1987 | Uffenheimer . |
| 4,690,621 | 9/1987 | Swain . |
| 4,694,976 | 9/1987 | Schuetz . |
| 4,714,177 | 12/1987 | Morris et al. . |
| 4,749,476 | 6/1988 | Storkebaum et al. . |
| 4,769,001 | 9/1988 | Prince . |
| 4,769,009 | 9/1988 | Dykstra . |
| 4,773,561 | 9/1988 | Sedam . |
| 4,808,078 | 2/1989 | Havens et al. . |
| 4,850,972 | 7/1989 | Schulman et al. . |
| 4,853,131 | 8/1989 | Etani . |
| 4,856,969 | 8/1989 | Forsythe et al. . |
| 4,863,066 | 9/1989 | Uffenheimer et al. . |
| 4,897,360 | 1/1990 | Guckel et al. . |
| 4,915,597 | 4/1990 | Moore . |
| 4,921,133 | 5/1990 | Roeser . |
| 4,944,657 | 7/1990 | Mowli . |
| 4,950,134 | 8/1990 | Bailey et al. . |
| 4,955,391 | 9/1990 | Parker et al. . |
| 4,973,404 | 11/1990 | Weber et al. . |
| 4,973,408 | 11/1990 | Keefer . |
| 4,983,102 | 1/1991 | Swain . |
| 5,061,156 | 10/1991 | Kuehne et al. ......................... 417/401 |
| 5,080,866 | 1/1992 | Petty et al. . |
| 5,134,962 | 8/1992 | Amada et al. ............................ 417/63 |
| 5,211,849 | 5/1993 | Kitaevich et al. . |

# FILTERING AND DISPENSING SYSTEM

This application is a continuation of application Ser. No. 07/835,632, filed Feb. 13, 1992, abandoned.

BACKGROUND AND SUMMARY OF THE INVENTION

This invention relates to a pumping and filtering system for use in dispensing precise amounts of filtered liquid at precise rates. In particular, the invention relates to a pump for dispensing liquids such as photoresist liquids which are used to manufacture semi-conductors.

U.S. Pat. No. 4,950,134 shows a pump which is useful in practicing the present invention. The pump described in U.S. Pat. No. 4,950,134 is a positive displacement electro-hydraulically operated diaphragm pump particularly useful in applying photoresist liquid during the manufacture of semiconductor wafers. The content of U.S. Pat. No. 4,950,134 is incorporated herein by reference.

The need for precision and careful deposition of photoresist liquids during the manufacture of semi-conductors is critical. Wafers, usually about 4 to 8 inches in diameter, are positioned beneath a dispense nozzle. An initial amount of photoresist liquid sufficient to form an initial layer of about 1.5 to 5 milliliters, according to the size of the wafer, is deposited. The wafer is then rotated in order to spread the liquid evenly over the surface of the wafer. The final thickness of the layer of photoresist liquid is measured in thousands of Angstroms.

In some systems, photoresist liquid is deposited in the center of the wafer when the wafer is motionless. In such static dispensing systems, a substantial amount of the photoresist liquid is spun from the wafer and discarded, wasting much of the photoresist liquid initially deposited on the wafer. However, a more efficient use of photoresist liquid occurs in dynamic dispensing systems in which the photoresist is deposited on a rotating wafer. The need for precision in the duration, amount and rate of deposition is even more critical in dynamic dispensing as opposed to static dispensing. Motion of the wafer in a dynamic dispense system causes the photoresist liquid to be dispensed in a predetermined pattern. Therefore, dispensing generally, and the dispense rate in particular, must be tightly controlled so that the dispense patter is consistent from one wafer to the next.

The liquids which are dispensed with pumps such as the one shown in U.S. Pat. No. 4,950,134 are preferably filtered through filters having very small openings, i.e. on the order of 0.1 to 0.2 microns. As a result, pressure of between about 3 and 7 psi are required to drive the liquid through such filters. However, in precisely dispensing liquids, it has been found advantageous to draw backward or "suckback" liquid at the dispensing nozzle. This is because as flow is stopped, drips, or potential drips, may form at the dispense nozzle. If a drop of photoresist liquid falls on a semi-conductor wafer after the desired amount has been dispensed, the coating on the wafer can become deformed, in which case the wafer may be reprocessed. This problem is present when the wafer remains directly beneath the dispense nozzle as the photoresist is dispersed by rotation of the wafer and during movement of the wafer away from the area beneath the nozzle.

The use of a separate line for purposes of conveying suckback liquid allows pressure to be maintained in the main dispensing line. It is particularly important to maintain pressure on the liquid in the area of the filter, because air bubbles, which are unavoidably present in the filter medium, will decompress if pressure is removed. This decompression and the subsequent recompression would, if allowed to occur, distort the measurement of the amount of liquid to be dispensed.

It is therefore an object of the present invention to provide a pumping system which is capable of dispensing precise amounts of liquid at predetermined rates.

Another object of the present invention is to provide a pumping system that repeatably disperses precise amounts of liquid at precise rates for precise durations.

A further object of the present invention is to provide a pumping system which facilitates the suckback of liquid through the system.

Still another object of the present invention is to provide a pumping system in which the useful life of the filters used in the system is improved.

Yet another object of the present invention is to provide a pumping and filtering system for liquids in which the liquid flows in only one direction through the filter.

Still another object of the present invention is to provide a pumping and filtering system in which variations in pressure on the liquid in the area of a filter is minimized.

A further object of the present invention is to provide a dispensing system in which the amount and rate of dispensing is repeatable within small tolerances over many cycles.

These and other objects of the present invention are achieved with a pumping system in which an electro-hydraulic diaphragm pump is used to withdraw liquid from a source bottle, and, in turn, drive the source liquid through a filter medium to a dispensing port. After a particular amount of the source liquid has been directed through the filter, the pump is used to draw the liquid away from the dispensing nozzle through a suckback line around the filter. This arrangement allows for the maintainence of generally constant pressure on the liquid, thus avoiding decompression and expansion of gases trapped in the filter medium.

A better understanding of the present invention will be obtained upon a reading of the following specification read in conjunction with the accompanying drawings, wherein:

DETAILED DESCRIPTION OF THE INVENTION

Figure 1:
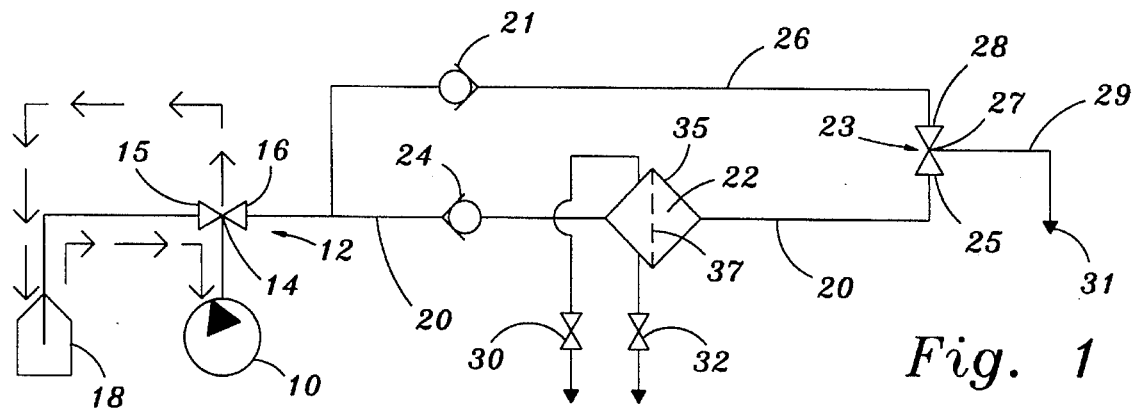
FIG. 1 is a schematic diagram of the pumping and filtering system of the present invention in an initial mode.

The pumping system of the present invention as shown in each of the drawings 1 through 4 includes a pump 10 in hydraulic communication in a three-way solenoid operated pump valve 12. The pump 10 is connected to the common port 14. A source bottle 18 is in hydraulic communication with the normally open port 15 of the pump valve 12. The normally closed port 16 of the pump valve 12 is connected to the main dispense line 20. A filter 22 is disposed in the main dispense line 20. A dispense line check valve 24 is also located in the main dispense line 20 between the filter 22 and the pump valve 12. The system also includes a three-way solenoid operated filter valve 23, and the main dispense line 20 is connected to the normally closed port 25 of the filter valve 23. A final dispense line 29 is connected to the common port 27 of the filter valve 23. A suckback line 26 is connected to the normally open port 28 of the filter valve 23. The suckback line 26 extends from the filter valve 23 to a point in the main dispense line 20 between the dispense line check valve 24 and the pump valve 12. A suckback check valve 21 prevents flow through the suckback line 26 in the direction of the filter valve 23.

FIG. 1 shows the system in an "initialize" mode. In the initialize mode, the pump valve 12 is not energized, which places the pump 10 in communication with the source bottle 18. Source fluid is withdrawn from the source bottle 18 into the pump 10.

Figure 2:
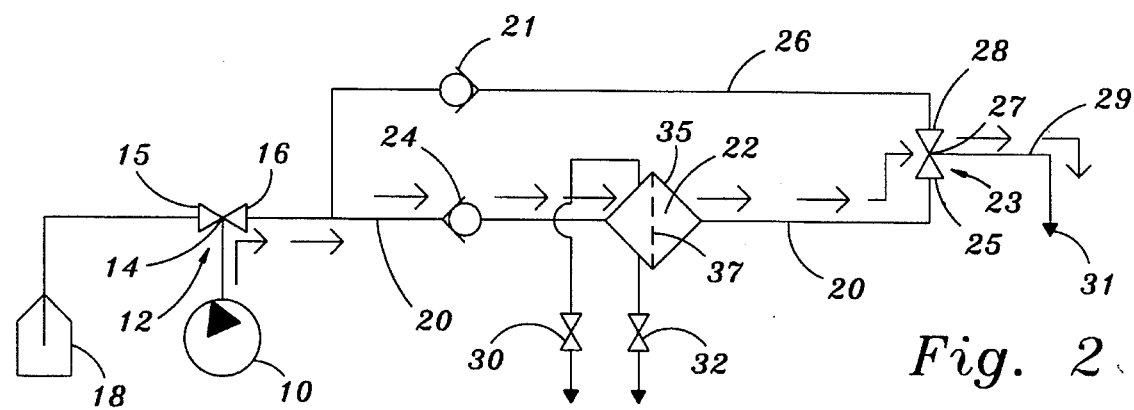
FIG. 2 is a schematic diagram of the pumping and filtering system of the present invention in a dispense mode.

FIG. 2 shows the system in a "dispense" mode. In the dispense mode, the pump valve 12 is energized, placing the pump 10 in fluid communication with the main dispense line 20. The suckback check valve 21 prevents flow of the source fluid through the suckback line 26. The driving forces of the pump 10 cause the source liquid to flow through the main dispense line 20 past the dispense check valve 24 and through the filter 22. In the dispense mode, the filter valve is energized, causing the main dispense line 20 to be in fluid communication with the final dispense line 29. As a result, the source liquid is driven through the filter valve 23 and through the final dispense line 29 out the dispense nozzle 31. In the system of the present invention, the nozzle may be a separate fitting, but need not be. The nozzle may simply be the end of a piece of tubing used to form the final dispense line 29.

Figure 3:
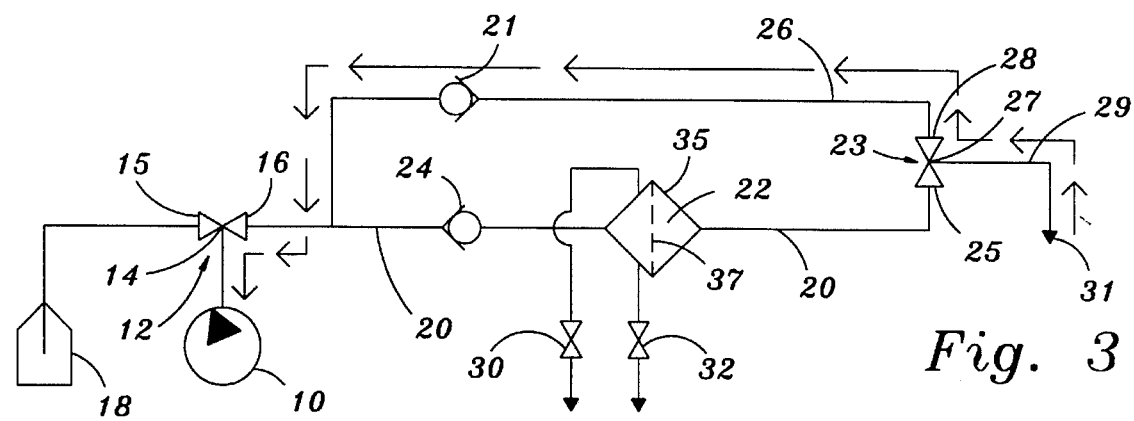
FIG. 3 is a schematic diagram of the pumping and filtering system of the present invention in the suckback mode.

FIG. 3 shows the system in a "suckback" mode. In the suckback mode, the pump valve 12 remains energized, whereas the filter valve 23 is de-energized so that the final dispense line 29 is in fluid communication with the suckback line 26. In the suckback mode, the pump 10 is reversed, drawing the source liquid away from the dispense nozzle through the final dispense line 29 and through the suckback line 26 and through the suckback check valve 21. In the suckback mode, the dispense check valve 24 prevents flow of liquid through the filter 22. Because substantial pressure, between 3 and 7 psi, is required to drive the source liquid through the filter 22 in the dispense mode, there is a short delay to achieve transition from the dispense mode to the suckback mode. The delay is due to the fact that the pump 10 must reverse and move in the negative direction to reduce the pressure in the main dispense line 20 and achieve a negative 0.5 psi, which is required to open the suckback check valve 21. The delay is on the order of about 0.5 seconds.

Figure 4:
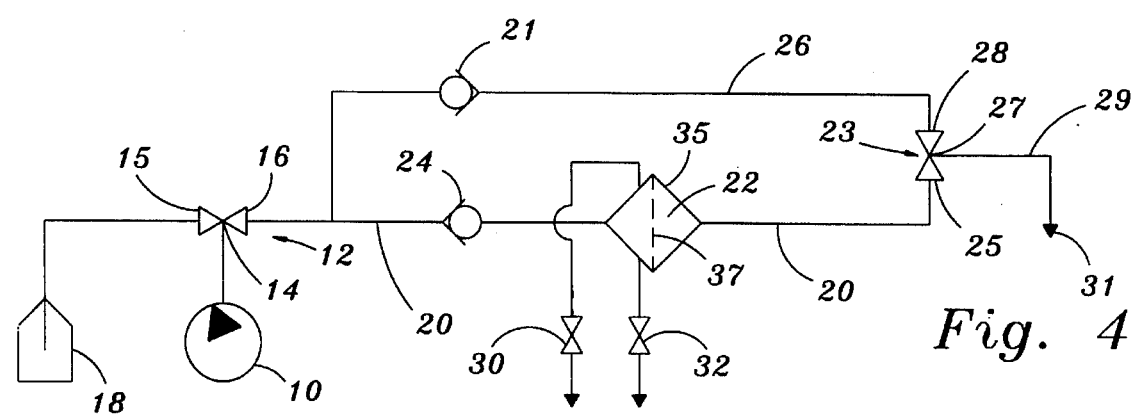
FIG. 4 is a schematic diagram of the pumping and filtering system of the present invention in a reload mode.

FIG. 4 shows the system in a "reload" mode. In the reload mode, the pump valve 12 is de-energized to allow the pump 10 to be in fluid communication with the source bottle 18 as it was in the initialized mode.

The pumping and filtering system of the present invention includes a filter housing 35 and a filter medium 37, shown schematically. The filter housing 35 and the filter medium 37 are preferably cylindrical elements, the filter housing 35 being generally hollow, and the filter medium 37 being a replaceable filter cartridge, such as the 0.1, 0.2 and 0.5 micron filter cartridges sold by Pall and Millipore. The filter housing 35 includes an airvent stopcock 30 to allow removal of air which inadvertently enters the system. The filter housing 35 also includes a drainstop stopcock 32 which allows removal of source liquid from the filter housing so that the filter 22 can be replaced.

The ability of the pumping and filtering system of the present invention to drawback fluid through the suckback line away from the dispensing nozzle without having to draw or suck fluid through the filter 22 is an important feature of the present invention. The ability to quickly draw fluid away from the dispense nozzle by use of the suckback line of the present invention allows for more precise delivery of liquids without the danger of damage to the semiconductor wafer coating due to post-deposition dripping of liquid which is not intended to be deposited. Relieving pressure in the main dispense line 20 to perform suckback would potentially create enlarged air bubbles in the filter. In the system of the present invention, pressure is maintained on fluid in the main dispense line in the area of the filter 22 and fluid flows from the dispense nozzle through the final dispense line 29 and through the suckback line 26 around the filter 22 upon reversal of the pump 10. The system of the present invention results in improved repeatability and accuracy of dispensing by avoiding the decompression and recompression of fluid in the filter 22.

A further advantage of the present invention is the fact that the fluid in the portion of the main dispense line 20, which extends between the dispense check valve 24 and the filter valve 23, remains under relatively constant pressure. Small pockets of air are practically unavoidable with filter media used to filter photoresist liquids. Filters, such as the Millipore and Pall brand 0.1 and 0.2 micron filters, have inherent design features which result in small pockets of entrapped air, despite efforts to eliminate such pockets.

Because air is substantially more compressible than photoresist liquid, changes in pressure in lines containing such filters can cause error in measurements of volume in those lines. The system of the present invention maintains the liquid in the filter under generally constant pressure. This is achieved by timing the activation and de-activation of the filter valve 23 with the pumping action of the pump 10. When a dispense cycle is completed, the solenoid controlling the filter valve 23 is deactivated, flow from the main dispense line 20 to the final dispense line 29 ceases, and liquid is trapped between the dispense check valve 24 and the filter valve 23 and maintained at a pressure which is generally equal to the pressure at which the liquid is dispensed. When dispensing is again required, the pump 10 is activated in the forward direction just prior to re-activation of the solenoid controlling the filter valve 23. The slight delay between the time when activation of the pump 20 in the driving direction occurs and the time when the main dispense line 20 and the final dispense line 29 are in fluid communication allows for the pump 10 to build up pressure in the main dispense line 20 between the pump 10 and the dispense check valve 24. This is necessary because that portion of the main dispense line is in fluid communication with the suckback line 26, which, during the suckback mode, has a negative pressure. This negative pressure is overcome and raised to a positive pressure equal to the pressure of liquid in the filter just as the main dispense line 20 and the final dispense line 29 are opened to each other by activation of the solenoid controlling the valve 23.

While a specific embodiment of the invention has been shown and described, it will be apparent to those skilled in the art that numerous alternatives, modifications, and variations of the embodiment shown can be made without departing from the spirit and scope of the appended claims.

We claim:

1. A system for precisely dispensing a predetermined amount of filtered liquid comprising:

a pump, a main dispensing channel, a final dispensing channel with a dispensing port, a suckback channel, a first controllable valve in said main dispensing channel disposed between a filter and said pump, a second controllable valve for alternatively connecting either said suckback channel or said main dispensing channel to said final dispensing channel, a first end of said suckback channel communicating with said main dispensing channel between said first controllable valve and said filter, a second end of said suckback channel communicating with said main dispensing channel and said final dispensing channel through said second controllable valve, said suckback channel having a first check valve for preventing flow through said suckback channel toward said dispensing port, said main dispensing channel having a second check valve for preventing flow from said filter to said pump, whereby said suckback channel is capable of diverting liquid around said filter.

2. A system in accordance with claim 1, wherein:

said pump is a positive displacement electro-hydraulic diaphragm type pump.

3. A system in accordance with claim 1, wherein:

said first and second controllable valves are first and second three-way solenoid operated valves, respectively, said first valve having a normally open unenergized condition in which said pump is capable of fluid communication with a source of liquid, and said first controllable valve has a normally closed energized condition in which said pump is in fluid communication with said main dispensing channel, said second controllable valve having a normally open un-energized condition in which said suckback line is in fluid communication with said final dispense line, and said second valve has a normally closed energized condition in which said main dispense line is in fluid communication with said final dispense line.

4. A system in accordance with claim 1 wherein:

said filter is disposed in a filter housing having an airvent stopcock and a drain stopcock.

5. A method of dispensing a precise amount of filtered liquid at specific rates using a positive displacement pumping system having a pump, a main dispensing channel, a final dispensing channel having a dispensing port, a filter in said dispensing channel, a first control valve, a second control valve, a suckback channel, said main dispensing channel having a first check valve preventing flow in the direction of said pump, and said suckback channel having a second check valve preventing flow toward said dispensing port, said method comprising the steps of:

placing said first control valve in a position whereby said pump is fillable with a source liquid, activating said pump so as to fill said pump with said source liquid, moving said first and second control valves to a position whereby said pump is capable of driving said source liquid through said filter and out of said dispensing pump, activating said pump to drive said source liquid though said filter causing filtered source liquid through said dispensing port, stopping and reversing said pump and moving said second control valve so as to cause said source liquid to flow from said final dispensing channel at least partially into said suckback channel, maintaining pressure in said main dispense channel on opposite sides of said filter.

6. A method in accordance with claim 5 wherein:

said first and second control valves are solenoid operated valves and said first steps of moving said valves are achieved by varying the voltage applied to solenoids which operate said valves.

7. A method in accordance with claim 5 wherein:

said method occurs in a series of modes:

a load mode in which said pump is filled with said source liquid, followed by a dispense mode in which positive pressure from said pump drives said source liquid from said pump through said main dispense line, through said filter and out of said dispense port, followed by a suckback mode in which source liquid is withdrawn away from said dispensing port through said valves and through said suckback line.

8. A pumping and filtering system comprising:

a pump for driving a liquid to be dispensed, a conduit for conveying said liquid from said pump to an exit port, a filter in said conduit and between said pump and said exit port for limiting flow of impurities to said exit port, a control valve for maintaining pressure on liquid in said conduit, said control valve disposed between said filter and said exit port, a main check valve disposed between said pump and said filter, said control valve disposed in said conduit on an opposite side of said filter from said main check valve, said main check valve tending to prevent flow of liquid in said conduit toward said pump, a suckback conduit extending from said control valve to a point in said conduit between said pump and said main check valve, said suckback conduit including a suckback check valve tending to prevent flow of liquid in said suckback conduit toward said control valve.

9. A pumping and filtering system in accordance with claim 8, wherein said system includes a pump valve for selectively allowing said pump to withdraw liquid from a source and allowing said pump to be in fluid communication with said conduit.

* * * * *